(12) United States Patent
Shanahan

(10) Patent No.: US 6,895,653 B2
(45) Date of Patent: May 24, 2005

(54) METHODS FOR REPAIRING WATER-COOLED GENERATOR STATOR BAR CLIPS

(75) Inventor: Michael Allen Shanahan, Brandon, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/878,985

(22) Filed: Jun. 28, 2004

(65) Prior Publication Data

US 2005/0005415 A1 Jan. 13, 2005

Related U.S. Application Data

(62) Division of application No. 10/065,930, filed on Dec. 2, 2002, now Pat. No. 6,763,563.

(51) Int. Cl.$^7$ .............................. B23Q 7/00; B23P 6/00
(52) U.S. Cl. .......................... 29/559; 29/889.1; 29/596; 310/54
(58) Field of Search ............................... 29/559, 889.1, 29/596, 281.1, 402.07; 156/94, 305; 310/52–54, 201; 269/43

(56) References Cited

U.S. PATENT DOCUMENTS

| | | | | |
|---|---|---|---|---|
| 5,581,869 A | * | 12/1996 | Travaly | 29/596 |
| 5,605,590 A | * | 2/1997 | Manning et al. | 156/94 |
| 6,763,563 B2 | * | 7/2004 | Shanahan | 29/281.1 |
| 6,784,573 B1 | * | 8/2004 | Iversen et al. | 310/52 |
| 2004/0103532 A1 | * | 6/2004 | Shanahan | 29/889.1 |

* cited by examiner

*Primary Examiner*—Lee D. Wilson
(74) *Attorney, Agent, or Firm*—Armstrong Teasdale LLP

(57) ABSTRACT

An apparatus for repairing a liquid cooled compressor stator bar bottle clip having a groove extending around an outer surface of the bottle clip is provided. In an exemplary embodiment, the repair apparatus includes a first body portion that includes a plurality of threaded fastener openings in a first end section and a second end section of the first body portion, a second body portion that includes a plurality of threaded fastener openings in a first end section and a second end section of the second body portion, and a plurality of threaded fasteners extending through corresponding fastener openings in the first and second body portions. The fasteners connect the first and second body portions such that an elliptical opening is defined between the first and second body portions. The elliptical opening extends through the repair apparatus.

8 Claims, 4 Drawing Sheets

METHODS FOR REPAIRING WATER-COOLED GENERATOR STATOR BAR CLIPS

CROSS-REFERENCE TO RELATED APPLICATIONS

This application is a divisional of U.S. patent application Ser. No. 10/065,930, filed Dec. 2, 2002 now U.S. Pat. No. 6,763,563, which is hereby incorporated by reference and is assigned to assignee of the present invention.

BACKGROUND OF THE INVENTION

This invention relates generally to apparatus and methods of repairing a stator bar of a generator, and particularly to apparatus and methods for repairing the stator bar clips.

Water-cooled stator bars for electrical generators include a plurality of small rectangular solid and hollow copper strands which are brazed to one another within the stator bar and brazed to the interior walls of an end fitting. The brazing material typically used is a copper phosphorous alloy. The end fitting serves as both an electrical and a hydraulic connection for the stator bar. The end fitting typically includes an enclosed chamber for ingress or egress of stator bar cooling liquid, typically deionized water. Thus, the end fitting provides a hollow chamber which serves to manifold the water passages of the strands. An opening of the end fitting receives the ends of the strands of the stator bar, the fitting and peripherally outermost copper strands of the stator bar being brazed to one another. A second opening includes a clip for connecting the bar to series loops/phase connections and a cooling water supply. This clip is often referred to as the stator bar bottle clip. Over time, leaks have variously developed about the connection between the stator bar ends and the stator bar end fitting as well as between adjacent strands. The end fitting-to-strand and strand-to-strand joints have the highest potential for causing damage should a leak occur because a leak at this location will flow directly into the ground wall insulation of the winding. The result is the degradation of the dielectric strength of the insulation which will eventually lead to failure. Also, the braised connections between the bar bottle clip to series loops/phase connections and cooling water supply piping can be weakened by excessive tolerances between the fixtures which requires the use of excessive braise alloy thereby causing a weak joint. Further, oversized and elliptical shaped bar clips can cause fitup problems and weak braised joints.

BRIEF DESCRIPTION OF THE INVENTION

In one aspect, an apparatus for repairing a liquid cooled compressor stator bar bottle clip having a groove extending around an outer surface of the bottle clip is provided. The repair apparatus includes a first body portion that includes a plurality of threaded fastener openings in a first end section and a second end section of the first body portion, a second body portion that includes a plurality of threaded fastener openings in a first end section and a second end section of the second body portion, and a plurality of threaded fasteners extending through corresponding fastener openings in the first and second body portions. The fasteners connect the first and second body portions such that an elliptical opening is defined between the first and second body portions. The elliptical opening extends through the repair apparatus.

In another aspect a method of repairing a liquid cooled compressor stator bar bottle clip having a groove extending around an outer surface of the stator bar bottle clip is provided. The method includes positioning a repair apparatus around the stator bar bottle clip, tightening the repair apparatus so that at least a portion of the repair apparatus contacts the outer surface of the stator bar bottle clip, and rotating the repair apparatus around the outer surface of the stator bar bottle clip. The repair apparatus includes a first body portion that includes a plurality of threaded fastener openings in a first end section and a second end section of the first body portion, a second body portion that includes a plurality of threaded fastener openings in a first end section and a second end section of the second body portion, and a plurality of threaded fasteners extending through corresponding fastener openings in the first and second body portions. The fasteners connect the first and second body portions such that an elliptical opening is defined between the first and second body portions. The elliptical opening extends through the repair apparatus.

In another aspect, an apparatus for repairing a liquid cooled compressor stator bar bottle clip having a groove extending around an outer surface of the bottle clip is provided. The repair apparatus includes a first body portion that includes a plurality of threaded fastener openings in a first end section and a second end section of the first body portion, a second body portion that includes a plurality of threaded fastener openings in a first end section and a second end section of the second body portion, and a plurality of threaded fasteners extending through corresponding fastener openings in the first and second body portions. The fasteners connect the first and second body portions such that an elliptical opening is defined between the first and second body portions. The elliptical opening extends through the repair apparatus. The repair apparatus also includes at least one guide pin extending from an inner surface of the elliptical opening. The at least one guide pin is sized and positioned to be received in the groove in the stator bar bottle clip.

DETAILED DESCRIPTION OF THE INVENTION

A repair apparatus and method of repairing a liquid cooled compressor stator bar bottle clip is described in detail below. The repair apparatus includes two body portions that are connected together by a plurality of fasteners. An elliptical opening is formed by the two body portions and is sized for the predetermined outer diameter of a bottle clip. The two body portions are positioned around the bottle clip and tightened. The apparatus is then rotated around the bottle clip to resize and reshape the bottle clip. After several rotations of the repair apparatus have been completed, the apparatus is retightened and the apparatus is again rotated around the bottle clip. The repair apparatus corrects oversized and elliptically shaped stator bar bottle clips on site which increases productivity and reduces the cost of correcting the problem of oversized and incorrectly shaped bottle clips.

Figure 1:
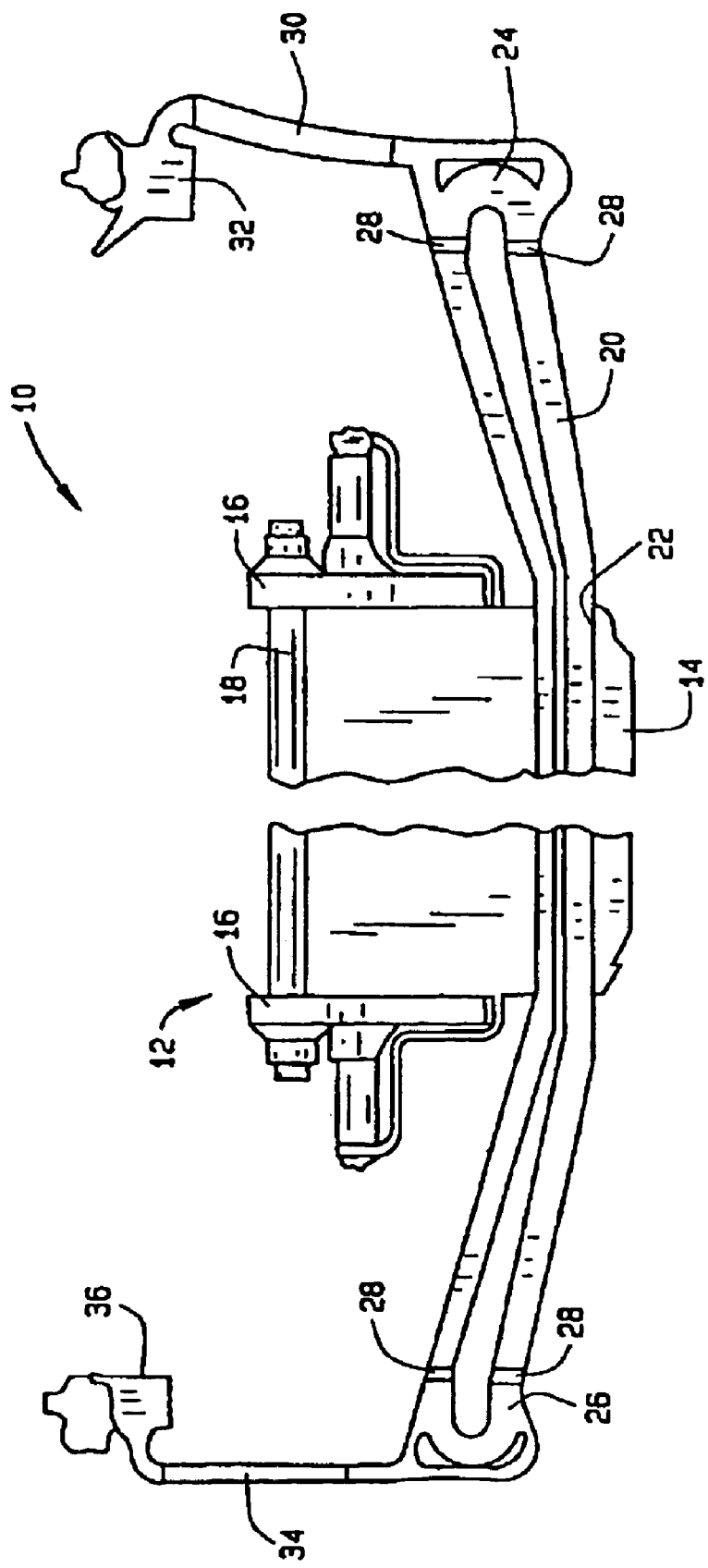
FIG. 1 is a schematic view of a liquid-cooled generator with parts cut away

Referring now to the drawings, FIG. 1 is a schematic view of a liquid-cooled generator 10 with parts cut away. In an exemplary embodiment, generator 10 includes a liquid cooled stator winding arrangement 12 that includes a stator core 14 having stator core flanges 16 and stator core ribs 18. Stator bars 20 pass through radially extending slots 22 in stator core 14. Inlet and outlet fittings 24 and 26, also referred to as bottle fittings 24 and 26, are connected to stator bars 20 by stator bar end fittings 28. Inlet hoses 30 connect inlet fitting 24 to an inlet coolant header 32, and outlet hoses 34 connect outlet end fitting 26 to an outlet coolant header 36. Stator bar end fittings 28 are formed of a electrically conductive material such as, for example, copper or brass.

Figure 2:
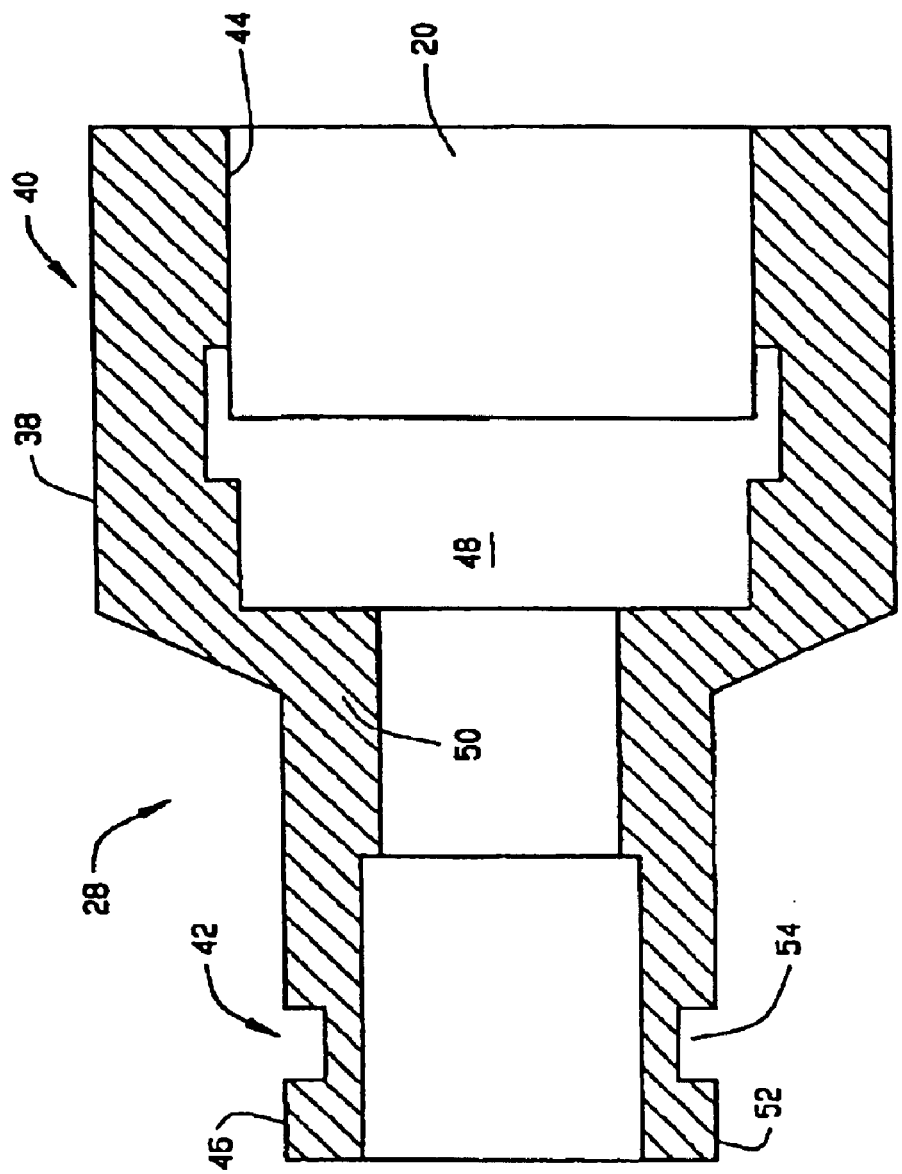
FIG. 2 is a sectional schematic view of the liquid cooled stator bar end fitting shown in FIG. 1.

Referring to FIG. 2, stator bar end fittings 28 includes a body 38 having a first end portion 40 and a second end portion 42. First end portion 40 includes a rectilinear opening 44 sized to receive a stator bar 20. Second end portion 42 includes an inlet/outlet port 46. Port 46 is also referred to as bottle clip 46 and is sized to connect to bottle fittings 24 and 26. Bottle clip 46 serves as both an electrical connection and a hydraulic conduit for flowing liquid coolant, for example, deionized water, into or from a chamber 48 defined by walls 50 of fitting 28 and stator bar 20. Liquid either flows into fitting 28 through chamber 48 and into stator bar 20 for cooling purposes when fitting 28 is an inlet fitting, or flows from stator bar 20 through chamber 48 and out bottle clip 46 when fitting 28 is employed as an outlet fitting. Bottle fittings 24 and 26 (shown in FIG. 1) are sized to engage an outer surface 52 of bottle clip 46. Typically, the joint between bottle fittings 24 and 26 with bottle clips 46 are sealed by braising. A groove 54 extends around outer surface 52 of bottle clip 46.

Figure 3:
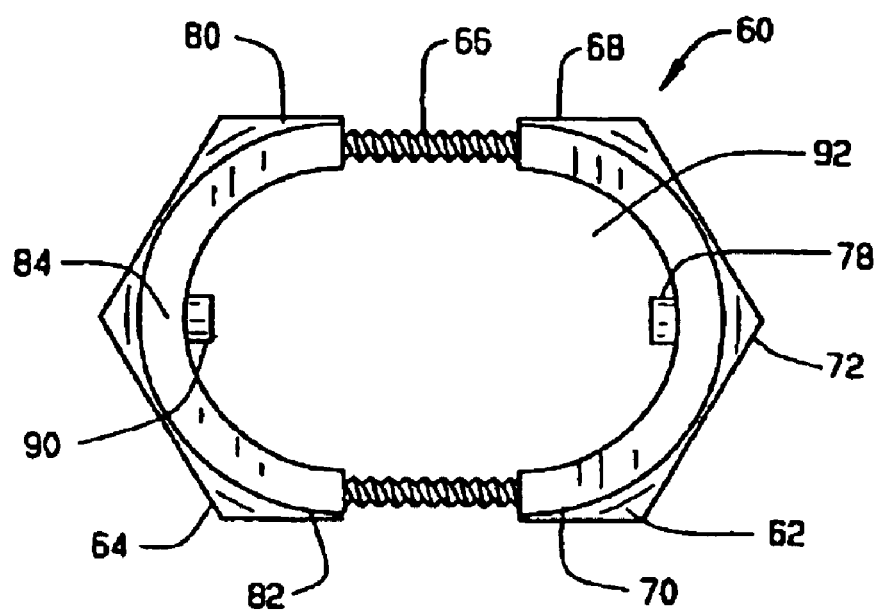
FIG. 3 is a top view of a bar clip repair tool in accordance with an embodiment of the present invention.
Figure 4:
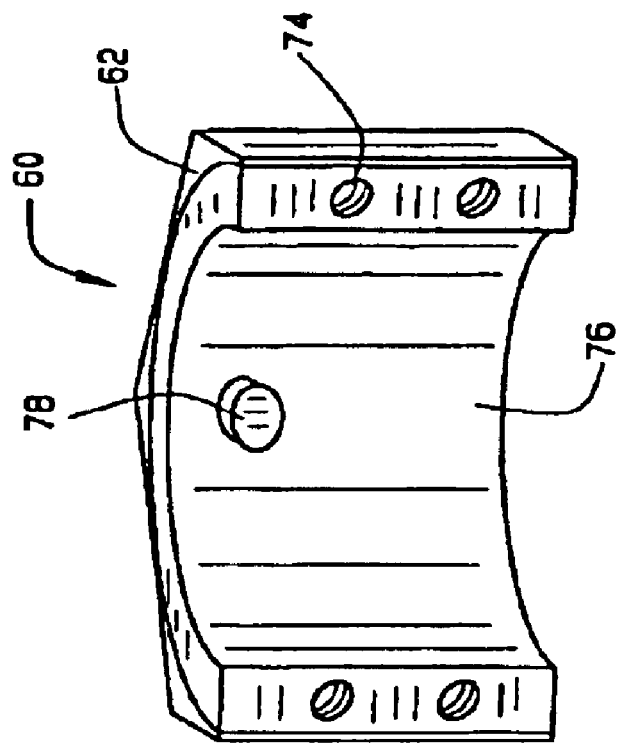
FIG. 4 is a perspective view of the repair tool shown in FIG. 4 in a disassembled state.
Figure 4:
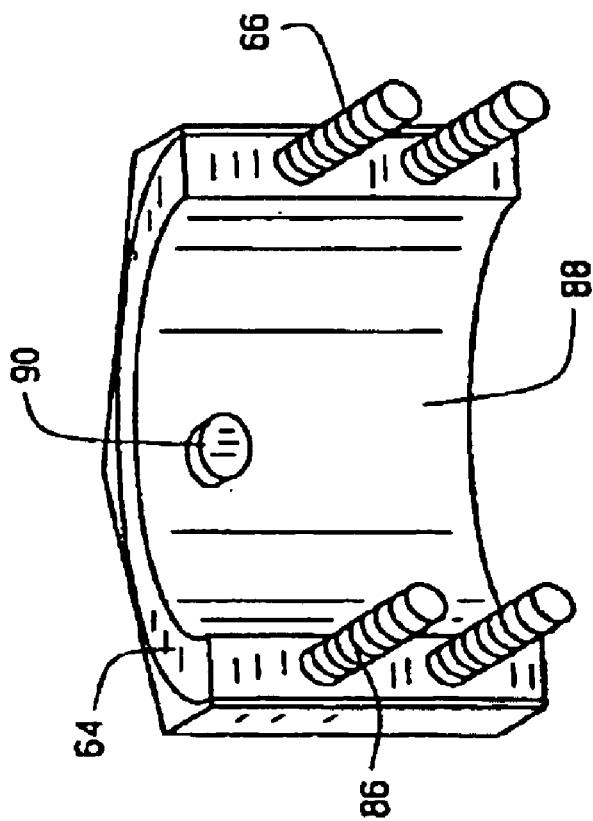

FIG. 3 is a top view of a bottle clip repair apparatus 60 in accordance with an embodiment of the present invention, and FIG. 4 is a perspective view of repair apparatus 60 shown in a disassembled state. Referring to FIGS. 3 and 4, repair apparatus 60 includes a first body portion 62 and a second body portion 64 coupled together by a plurality of fasteners 66. First body portion 62 includes a first end section 68, a second end section 70 and a center section 72. A plurality of threaded fastener openings 74 are located in first and second end sections 68 and 70. Fastener openings 74 are sized to threadedly receive fasteners 66. Center section 72 includes an arcuate inner surface 76 with a guide pin 78 extending from inner surface 76.

Second body portion 64, similar to first body portion 62, includes a first end section 80, a second end section 82 and a center section 84. A plurality of threaded fastener openings 86 are located in first and second end sections 80 and 82. Fastener openings 86 are sized to threadedly receive fasteners 66. Center section 84 includes an arcuate inner surface 88 with a guide pin 90 extending from inner surface 88. In the exemplary embodiment, each threaded fastener opening 74 in first body portion 62 is aligned with a corresponding treaded fastener opening 86 in second body portion 64. Repair apparatus 60 is assembled by extending fasteners 76 through aligned fastener openings 74 and 86 in first and second body portions 62 and 64 respectively. An elliptical center opening 92 is defined between first and second body portions 62 and 64. Repair apparatus 60 can be fabricated from any suitable material that is harder than bottle clip 46, for example, steel, stainless steel, and the like.

Figure 5:
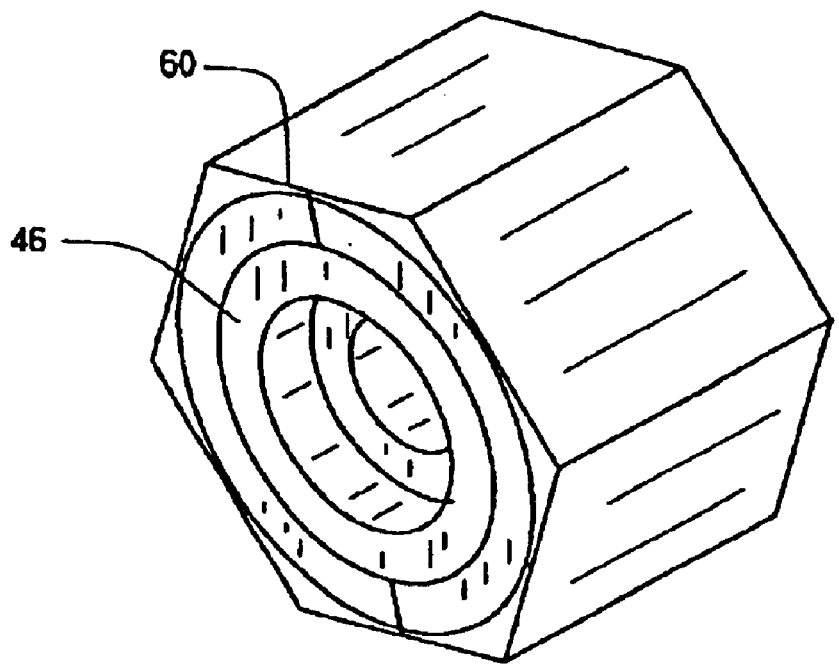
FIG. 5 is a view of the repair tool shown in FIG. 4 attached to the liquid cooled stator end fitting shown in FIG. 3.

To repair bottle clip 46, repair apparatus 60 is positioned around bottle clip 46 with inner surfaces 76 and 88 of first and second body portions 62 and 64 contacting an outer surface 62 of bottle clip 46 and with guide pins 78 and 90 positioned in groove 54. Fasteners 66 are tightened causing first and second body portions 62 and 64 to exert a force on bottle clip 46. Repair apparatus 60 is then rotated around bottle clip 46 to resize and reshape bottle clip 46. Guide pins 78 and 90 ensure proper placement and alignment as apparatus 60 is rotated. After several rotations, fasteners are retightened and apparatus 60 is again rotated around bottle clip 46. The tightening and rotating of apparatus 60 is repeated until the predetermined size and/or shape of bottle clip has been achieved. The elliptical shape of center opening 92 provides the force to reshape bottle clip 46 while permitting enough clearance at the matting joint to allow bottle clip 46 to flex during the reshaping process. In the exemplary embodiment, the major axis of elliptical opening 92 extends between first and second end sections of first and second body portions 62 and 64 when fasteners 66 are completely tightened with first end sections 68 and 80 and second end sections 70 and 82 adjacent each other. FIG. 5 shows repair apparatus 60 in a completely tightened state on bottle clip 46.

While the invention has been described in terms of various specific embodiments, those skilled in the art will recognize that the invention can be practiced with modification within the spirit and scope of the claims.

What is claimed is:

1. A method of repairing a liquid cooled compressor stator bar bottle clip, the stator bar bottle clip comprising a groove extending around an outer surface of the stator bar bottle clip, said method comprising:

positioning a repair apparatus around a stator bar bottle clip;

tightening the repair apparatus so that at least a portion of the repair apparatus contacts the outer surface of the stator bar bottle clip; and rotating the repair apparatus around the outer surface of the stator bar bottle clip, the repair apparatus comprising;

a first body portion comprising a plurality of threaded fastener openings in a first end section and a second end section of the first body portion;

a second body portion comprising a plurality of threaded fastener openings in a first end section and a second end section of the second body portion; and a plurality of threaded fasteners extending through corresponding fastener openings in the first body portion and the second body portion, the fasteners for connecting the first and second body portions such that an elliptical opening is defined between the first and the second body portions, the elliptical opening extending through the repair apparatus.

2. A method in accordance with claim 1 further comprising:

retightening the repair apparatus; and rotating the retightened repair apparatus around the outer surface of the stator bar bottle clip.

3. A method in accordance with claim 2 further comprising:

(a) retightening the repair apparatus;

(b) rotating the retightened repair apparatus around the outer surface of the stator bar bottle clip; and (c) repeating (a) and (b) until a predetermined diameter of the bottle clip is achieved.

4. A method in accordance with claim 1 wherein the repair apparatus further comprises at least one guide pin extending from an inner surface of the center opening, the at least one guide pin sized and positioned to be received in the groove in the stator bar bottle clip, and positioning a repair apparatus around a stator bar bottle clip further comprises positioning the repair apparatus around a stator bar bottle clip so that the at least one guide pin is positioned in the groove in the outer surface of the stator bar bottle clip.

5. A method in accordance with claim 4 wherein the repair apparatus further comprises a first guide pin located in said first body portion and a second guide pin located in said second body portion, and positioning a repair apparatus around a stator bar bottle clip further comprises positioning the repair apparatus around a stator bar bottle clip so that the first and second guide pins are positioned in the groove in the outer surface of the stator bar bottle clip.

6. A method in accordance with claim 1 wherein tightening the repair apparatus comprises tightening the plurality of threaded fasteners in the plurality of threaded fastener openings to move first body portion and second body portion closer together so as to exert a force on the outer surface of the bottle clip.

7. A method in accordance with claim 6 wherein each said threaded fastener opening of said first body portion is aligned with a corresponding threaded fastener opening of said second body portion.

8. A method in accordance with claim 1 wherein the elliptical opening comprises a major axis and a minor axis, the major axis extending between the first and second end section of the first and second body portions when the first end section of the first body portion is adjacent the first end section of the second body portion and the second end section of the first body portion is adjacent the second end section of the second body portion.

* * * * *